| United States Patent [19] | [11] | 3,977,999 |
|---|---|---|
| Erickson | [45] | Aug. 31, 1976 |

[54] ALUMINA COMPOSITIONS AND METHODS FOR MAKING AND USING SAME

[75] Inventor: Henry Erickson, Park Forest, Ill.

[73] Assignee: Atlantic Richfield Company, Philadelphia, Pa.

[22] Filed: Sept. 7, 1972

[21] Appl. No.: 286,993

[52] U.S. Cl.................................. 252/441; 252/442; 252/463; 252/466 PT; 208/138; 208/139

[51] Int. Cl.².................... B01J 27/08; B01J 27/10; B01J 27/12

[58] Field of Search.............. 252/463, 466 PT, 441, 252/442

[56] References Cited
UNITED STATES PATENTS

| 3,060,132 | 10/1962 | Neeks et al. .................... 252/429 B |
|---|---|---|
| 3,415,737 | 12/1968 | Kluksdahl ................. 252/466 PT X |
| 3,520,654 | 7/1970 | Carr et al........................ 252/463 X |
| 3,654,186 | 4/1972 | Vesely ............................ 252/448 X |
| 3,669,904 | 6/1972 | Cornelius et al................ 252/463 X |
| 3,725,249 | 4/1973 | Vesely et al. .................... 252/441 X |

*Primary Examiner*—Patrick P. Garvin
*Attorney, Agent, or Firm*—Frank J. Uxa

[57] ABSTRACT

A composition of matter useful, for example, as a catalyst component, comprising macrosized particles containing a mixture of two distinct phases, the phases being 1) calcined discrete entities comprising first alumina a major portion of which have a minimum dimension greater than about 50 microns and a maximum dimension of less than 200 microns and 2) a phase comprising calcined second alumina wherein the weight ratio of (1) to (2) is within the range from about 0.05:1 to about 2:1 and the second alumina is first calcined after the formation of microsize particles.

Methods for producing this composition of matter and for using this composition of matter in a hydrocarbon conversion process are also included.

18 Claims, No Drawings

ALUMINA COMPOSITIONS AND METHODS FOR MAKING AND USING SAME

This invention relates to an improved composition of matter containing alumina and a method for making same. More particularly, the invention relates to compositions useful, for example, as catalysts and catalyst supports which have improved stability, activity, or both, and methods for producing and using these compositions.

Alumina and alumina-supported metal containing catalysts have been demonstrated in the prior art to be useful for catalyzing a wide variety of chemical reactions. The reactions which are promoted by these types of catalyst include hydrocracking, isomerization, dehydrogenation, hydrogenation, desulfurization, cyclization, alkylation, polymerization, cracking, hydroisomerization and the like. Integrated processes such as hydrocarbon reforming or hydroforming, hydrocarbon hydrocracking, hydrocarbon isomerization and the like may utilize catalysts containing alumina.

After a period of time in service, these catalysts become deactivated and must be either replaced or regenerated. In order to reduce the frequency of such catalyst replacements or regenerations, it is desirable that catalysts containing alumina maintain reasonably high catalytic activity over a protracted period in service. In other words, the activity and/or stability of the catalyst should be maximized.

Therefore, it is an object of the present invention to provide improved alumina and alumina-based compositions.

Another object of the present invention is to provide a method for producing improved alumina and alumina-based compositions.

An additional object of the present invention is to provide an improved hydrocarbon conversion process.

A still further object of the present invention is to provide improved alumina and alumina-based compositions for use as hydrocarbon conversion catalysts. Other objects and advantages will become apparent hereinafter.

A new and improved composition of matter useful as a catalyst support has now been discovered. This composition of matter comprises macrosize particles containing a mixture of two distinct phases. These phases are (1) calcined discrete entities comprising first alumina, a major portion of which have a minimum dimension of greater than about 50 microns and a maximum dimension of less than about 200 microns and (2) a phase comprising calcined second alumina wherein the ratio of (1) to (2) is within the range from about 0.05:1 to about 2:1, preferably from about 0.1:1 to about 1.5:1 and more preferably from about 0.2:1 to about 1:1. It is preferred that at least 80%, more preferably at least about 90%, by weight of the discrete entities upon calcination have a maximum dimension of less than about 200 microns. It is also preferred that each of the first and second aluminas to be derived from hydrous alumina predominating in a material selected from the group consisting of alumina monohydrate, alumina trihydrates and mixtures thereof. Preferably, both first and second aluminas are derived from hydrous alumina predominating in the same material. Most preferably, this same material is alumina monohydrate.

In another aspect of the present invention, a method for producing a new and improved composition of matter has been discovered. This method comprises:

1. forming (a) a first aqueous slurry of hydrous alumina, drying at least a portion of said first slurry and thereby forming discrete entities the major portion of which upon calcination have a minimum dimension of greater than about 50 microns and a maximum dimension of less than about 200 microns and calcining said discrete entities. and (b) forming a second aqueous slurry of hydrous alumina, and drying at least a portion of said second slurry at a temperature below the point at which substantial amounts of water of hydration are released from the hydrated alumina to form a solid product which can be formed into macrosize particles;

2. co-mingling said calcined discrete entities and said solid product to form a mixture wherein the weight ratio of said discrete entities to said solid product, based upon $Al_2O_3$, is within the range from about 0.05:1 to about 2:1, preferably from about 0.1:1 to about 1.5:1 and more preferably from about 0.2:1 to about 1:1;

3. forming said mixture into macrosize particles; and 4. calcining said macrosize particles.

It is preferred that at least about 80%, more preferably at least about 90%, by weight, of the discrete entities upon calcination have a maximum dimension of less than about 200 microns.

The terms minimum dimension and maximum dimension as used herein refer to the smallest and largest, respectively, linear transverse dimension of an entity. The minimum and maximum dimension may be a length, width, diameter and the like linear transverse dimensions. The circumference of an entity is not within the scope of the terms minimum dimension and maximum dimension as used herein.

The aqueous slurries formed in step (1) of the above method may, and preferably are, prepared, i.e., formed, as one slurry and divided into two portions. Of course, these slurries can be prepared separately. Each of these slurries preferably contains about 5 to about 16, more preferably about 8 to about 14, weight percent of alumina (calcualated as $Al_2O_3$). The preparation of these slurries may be by various methods known in the art. Thus, for instance, hydrated alumina can be precipitated from an aqueous solution of a soluble aluminum salt such as aluminum chloride. Ammonium hydroxide is a useful agent for effecting the precipitation. Control of the pH to maintain it within the values of about 7 to about 10 during the precipitation is desirable for obtaining a good rate of conversion. Extraneous ions, such as halide ions, which are introduced in preparing the slurries can, if desired, be removed by filtering the alumina hydrogel from its mother liquor and washing the filter cake with water. Also, if desired, the hydrogel can be aged, say for a period of several days, prior to utilizing it in the method of the present invention. The effect of such aging is to build up the concentration of alumina trihydrates in the hydrogel. Such trihydrate formation can also be enhanced by seeding the slurries with crystallites of, for example, gibbsite. Thus, for instance, it is often preferred that a major amount, most preferably about 50 to about 95 percent, of the alumina content in the slurries formed in step (1) of the method be in the trihydrate form, e.g., as one or more of bayerite, gibbsite or nordstrandite (previously called randomite). Most preferably, a major amount of the trihydrate portion is composed of bayerite or nordstrandite.

Preferably, the hydrous alumina in each of the slurries formed in step (1) predominates in a material selected from the group consisting of alumina monohydrate, alumina trihydrates and mixtures thereof. It is more preferred that the hydrous alumina in both slurries predominate in the same material and, in particular, alumina monohydrate. Each of these slurries may also contain amorphous hydrous alumina.

The drying of the slurries according to step (1) of the above method can be accomplished in various manners — for example, by drum drying, flash drying, spray drying, tunnel drying and the like. In order to easily obtain discrete entities of the proper size, it is preferred to use spray drying in processing the first aqueous slurry. As stated above, the drying temperature of the second aqueous slurry is to be kept below the point at which substantial amounts of water of hydration, — i.e., combined water — are released from the alumina. Usually, this will be below about 500°F. The extent to which the second slurry is dried may depend upon the method of macroforming to be employed in step (3) of the process. Where, for example, the macroforming is to be by extrusion of the mixture, then the drying of the second aqueous slurry in step (1) can be halted sooner, since to obtain an extrudable mixture, or dough, usually requires the presence of about 20 to 40 weight percent of free water. Before macroforming, it may be preferred to first comminute the dried second slurry to a fine particle size, e.g., passing through about 30 mesh (Tyler). To facilitate such comminuting, then, it is preferred to first dry the second slurry to obtain a product in which the free water content is less than about 5 weight percent. If more water is required for the macroforming operation, it can be added after the comminuting has been completed.

As stated above, then, step (3) of the method, forming into macrosize particles, can be performed, for example, by tabletting or extruding the mixture formed in step (2) of the method. It is customary, especially in the case of tabletting, to incorporate in the mixture minor amounts of a die lubricant which is either nondeleterious to the final composite or which can be removed by the subsequent calcining step. Often employed, for example, are organic compounds, e.g., polyethylene, which, by calcining the formed particles in an oxidizing atmosphere, can be subsequently burned away.

When macroforming by extrusion, sufficient water should be present in the mixture to provide a workable dough. As stated above, this can be accomplished by terminating the drying of the second slurry in step (1) once the free water content of the solid product has reached about 20 to about 60, preferably from about 20 to about 40, weight percent. Also, as mentioned above, however, it may be preferred to first dry the second slurry to obtain a mixture which is low enough in water content to enable the solid product to be readily comminuted, then grind the solid product to a small particle size, comingle the solid product and discrete entities, add back water to achieve a dough-like consistency and then extrude the mixture into macrosize particles.

The size selected for the macrosize particles can be dependent upon the intended environment in which the composition is to be used — as, for example, whether in a fixed or moving bed reaction system. Thus, for example, where, as in the preferred embodiment of the present invention, the composition is designed for use as a catalyst in hydrocarbon reforming operations employing a fixed bed of catalyst, the mixture will preferably be formed into particles having a minimum dimension of at least about 0.01 inch and a maximum dimension up to about one-half inch or one inch or more. Particles having a diameter of about 0.03 to 0.25 inch, preferably about 0.03 to 0.15 inch, are often preferred, especially for use in fixed bed reforming operations.

Calcining of the discrete entities and macroformed particles according to steps (1) and (4) of the process is performed at temperatures sufficient to effect release of the water of hydration of the discrete entities and macroformed particles. Generally suitable are temperatures of about 600° to 1200°F., preferably about 850° to 1000°F. Although calcination can be effected in an inert atmosphere such as nitrogen, it is preferred to employ either an oxidizing or reducing environment. Thus, either oxygen-containing gases, such as dry air, or hydrogen-containing gases are advantageously employed. Inert diluent gases such as nitrogen can be present in admixture with the oxygen or hydrogen. It is usually advantageous to conduct the calcination in a flowing stream of the gaseous atmosphere. Atmospheric, super-atmospheric or sub-atmospheric pressures can be employed.

Where the macrosize particles contain significant amounts, say about 5 weight percent or more, of uncombined water — as, for example, will usually be the case where the macroformed particles have been formed by extrusion — then, either as a separate operation or in the first state of the calcination, the macroformed particles can, with advantage, first be dried at temperature below the critical temperature of water, which is about 705°F. Higher temperatures can cause fissures and rupture of the particles. Thus, prior to being heated to as high as about 700°F., preferably prior to being heated above about 500°F., the uncombined water content should be lowered to at least below about 5 weight percent of the composition.

It is preferred that at least one of the slurries formed in step (1) of the present method be dried in the presence of at least one surface active agent.

Surface active agents useful in the method of the present invention may generally be defined as those compounds having the ability to lower the tension prevailing at a given phase interface. In many instances, molecules of surface active agents include at least one hydrophobic portion and at least one hyrophilic portion. A wide variety of suitable surface active agents are known to the art and include anionic, cationic, and nonionic materials.

Included among the useful surface active agents are the anionic type exemplified by the alkyl aryl sulfonates and alkenyl aryl sulfonates which contain from about 13 to about 20 carbon atoms per molecule. Alkyl sulfonates and akenyl sulfonates which contain from about 10 to about 30 carbon atoms per molecule also are suitable as well as ester sulfonates, amide sulfonates, sulfo fatty esters and primary and secondary alkyl sulfates which contain from about 10 to about 30 carbon atoms per molecule.

Useful cationic surface active agents include quaternary ammonium components which contain from about 5 to about 30 carbon atoms per molecule.

Among the nonionic surfactants which are of particular usefulness in the present invention are $$R-(OC_2H_4)_x-OH$$

and mixtures thereof wherein R is selected from the group consisting of monovalent hydrocarbon radicals containing from about 10 to about 50, preferably from about 14 to about 40, carbon atoms and $x$ is an integer from about 2 to about 50, preferably from about 6 to about 30. Included among the monovalent hydrocarbon radicals are alkyl, such as decyl, tetradecyl, stearyl and the like; alkenyl such as decenyl, tetradecenyl, oleic and the like; alkaryl and polyalkaryl in which each of the alkyl substituents contains from about 5 to about 18 carbon atoms such as pentyl phenyl, di pentyl phenyl, decyl phenyl, didecyl phenyl, stearyl phenyl, penyl naphthyl, di penyl naphthyl, decyl di-phenyl and the like. In each instance, these radicals may include those non-hydrocarbon substituents which do not materially interfere with the surface active properties of the compound, for example, —OH, —NH$_2$, halide radicals, —SH and the like. These particularly useful non-ionic surfactants may be prepared by conventional means, for example, by condensing ethylene oxide with alcohols, alkyl phenols, fatty acids, and the like.

Because the ionic surface active agents may contain metal or other ions and may contaminate the final alumina product, it is preferred that the nonionic surface active agents be used when practicing the method of the present invention.

As noted previously, the alumina and alumina based particles prepared by the method of the present invention may be of use as a catalyst and/or catalyst support in various important processes, e.g., hydrocarbon reforming and hydrodesulfurization, hydrocarbon hydrocracking, paraffin and aromatic hydrocarbon isomerization and the like. In order to be useful in certain of these processes, it may be necessary to add other components to the alumina and alumina based particles of the present invention. Procedures for adding these various components to the alumina and alumina based particles are conventional and well known to the art and, therefore, need not be reiterated here.

To illustrate the use of the alumina particles prepared by the method of the present invention as catalyst and catalyst support, a hydrocarbon reforming embodiment is described in detail as follows. In general, hydrocarbon reforming refers to a process whereby hydrocarbon feedstock comprising paraffins and naphthenes is contacted in at least one reaction zone with a catalyst comprising a platinum group metal and alumina in the presence of free molecular hydrogen at hydrocarbon conversion conditions to yield a high octane and/or aromatics-rich product.

A fully compounded hydrocarbon reforming catalyst can be obtained by treating the alumina of the present invention with a platinum group metal component using any one of many conventional methods, such as ion exchange with the alumina, or by impregnation of the macrosize particles at any stage in its preparation and either before or after the calcination referred to in step (4) of the present method. The preferred method for adding the platinum group metal to the alumina involves the use of a water soluble compound of the platinum group metal to impregnate the alumina following the calcination referred to in step (4). For example, platinum can be added to the calcined alumina particles by co-mingling this alumina with an aqueous solution of chloroplatinic acid. The platinum group metals include platinum, palladium, rhodium, ruthenium and the like with platinum being preferred for use in the hydrocarbon reforming catalyst. Generally, the amount of the platinum group metal present in the final reforming catalyst is small compared to the quantities of the other components combined therewith. In fact, the platinum group metal component generally comprises from about 0.05 to about 3%, preferably from about 0.05 to about 1.0%, by weight of the catalyst calculated on an elemental basis. Excellent results are obtained when the catalyst contains from about 0.2 to about 0.9% by weight of the platinum group metal.

Other components may also be included in the hydroreforming catalyst. Among these added components are metals such as rhenium, germanium, iridium, tin and the rare earth metals such as cerium, with rhenium being preferred. When rhenium is included in the catalyst, it is normally present in an amount from about 0.01 to about 5%, preferably from about 0.05 to about 1.0%, by weight calculated as the elemental metal. The rhenium component may be incorporated into the catalyst in any suitable manner and at any stage in the preparation of the catalyst. For example, the procedure for incorporating the rhenium component may involve the impregnation of the alumina particles either before, during or after the time the platinum group metal is added. This impregnation may take place by comingling the alumina with an aqueous solution of a suitable rhenium salt such as ammonium perrhenate and the like or an aqueous solution of perrhenic acid.

The fully compounded hydrocarbon reforming catalyst may also include a halogen component. This combined halogen may be fluorine, chlorine and bromine and mixtures thereof with fluorine and particularly chlorine being preferred for the purposes of the present invention. The halogen may be added to the alumina particles in any suitable manner either during preparation of the macrosize particles or before or after the addition of the catalytically active metallic components described previously. In any event, if the halogen is included, it is added in such a manner as to result in a fully composited catalyst that contains from about 0.1 to about 1.5%, preferably from about 0.6 to about 1.3% by weight of halogen calculated on an elemental basis.

When using the hydrocarbon reforming catalyst as prepared above, the hydrocarbon reforming system may comprise a reforming zone containing at least one fixed bed of catalyst previously characterized. This reforming zone may be one or more separate reactors with suitable heating means there between to compensate for the net endothermic nature of the reactions that take place in each catalyst bed. The hydrocarbon feed stream that is charged to the reforming system may comprise hydrocarbon fractions containing naphthenes and paraffins that boil within the gasoline range. Typically, the hydrocarbon feed stream may comprise from about 20 to about 70% by weight of naphthenes and from about 25 to about 75% by weight of paraffins. The preferred charge stocks are those consisting essentially of naphthenes and paraffins, although in some cases aromatics and/or olefins may also be present. When aromatics are included in the hydrocarbon charge stock, these compounds comprise from about 5 to about 25% by weight of the total hydrocarbon charge stock. A preferred class of charge stocks includes straight run gasolines, natural gasolines, synthetic gasolines and the like. On the other hand, it is frequently advantageous to charge thermally or catalytically cracked gasolines including hydrocracked material or higher boiling fractions thereof, called heavy naphthas. Mixtures of straight run and cracked gasolines can also be used to advantage. The gasoline charge stock may be a full boiling range gasoline having an initial boiling point of from about 50°F. to about 150°F. and an end boiling point within the range of from about 325°F. to about 425°F., or may be a selected fraction thereof which generally will be a higher boiling fraction commonly referred to as a heavy naphtha — for example, a naphtha boiling in the range of about $C_7$ to about 400°F. In some cases, it is also advantageous to charge pure hydrocarbons or mixtures of hydrocarbons that have been extracted from hydrocarbon distillates — for example, a straight-chain paraffin — which are to be converted to aromatics. It is preferred that these charge stocks be treated by conventional pretreatment methods, if necessary, to remove substantially all sulfurous and nitrogenous contaminants therefrom.

In hydrocarbon reforming, reaction pressure in the range from about 50 psig. to about 1,000 psig. preferably from about 100 psig. to about 600 psig, is employed. Reforming operations may be conducted in the more preferable pressure range from about 100 psig. to about 400 psig. For optimum reforming results, the temperature in the reaction zone should preferably be within the range from about 700°F. to about 1100°F., more preferably in the range from about 800°F. to about 1050°F. The initial selection of the temperature within this broad range is made primarily as a function of the desired octane of the final reformate considering the characteristics of the chargestock and of the catalyst. The temperature may then be slowly increased during the run to compensate for the inevitable deactivation that occurs to provide a constant octane product. In accordance with the hydrocarbon reforming processes, sufficient hydrogen is supplied to the reaction zone to provide from about 2.0 to about 20 moles of hydrogen per mole of hydrocarbon entering the reaction zone with excellent results being obtained when from about 7 to about 10 moles of hydrogen are supplied per mole of hydrocarbon chargestock. Likewise, the weight hourly space velocity, i.e., WHSV, used in reforming may be in the range from about 0.5 to about 10.0 with a value in the range from about 2.0 to about 5.0 being preferred.

The following examples illustrate more clearly the compositions and methods of the present invention. However, these illustrations are not to be interpreted as specific limitations on this invention.

EXAMPLE I

This example illustrates an improved method and composition of the present invention.

An aqueous alumina hydrate slurry was formed so that the alumina concentration, calculated as $Al_2O_3$, was 9.15% by weight. The composition of the alumina hydrate had been established by X-ray diffraction to be 56% by weight boehmite, and 44% by weight amorphous alumina hydrate. The average boehmite crystallite size was 56 A units. This slurry was stirred for 1 hour to insure uniformity. A commercially available liquid, low foaming, nonionic surface active agent having the following structural formula

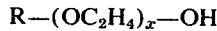

wherein R is an alkyl phenol radical containing an average of about 18 carbon atoms and $x$ is an integer having an average value of about 20 was added to this slurry such that this surface active agent amounted to about 0.1% by weight of the total water present in the slurry. The slurry was again stirred to insure uniformity and then spray dried at a temperature less than that required to eliminate a substantial portion of the water of hydration to form discrete entities. A portion of these discrete entities were calcined in an electric muffle furnace using a programmed timer to increase the temperature 300°F. per hour to 1050°F. and maintain this temperature for 3 hours.

Essentially all the calcined discrete entities had a maximum dimension of less than about 200 microns. Micromesh analysis of these calcined discrete entities was as follows:

|  | Wt.% of Total Calcined Discrete Entities |
|---|---|
| On 75 Micron Screen | 23.5 |
| On 60 Micron Screen | 14.4 |
| On 45 Micron Screen | 15.7 |
| On 30 Micron Screen | 21.6 |
| On 20 Micron Screen | 17.0 |
| Through 20 Micron Screen | 7.8 |
| Total | 100.0 |

200 grams of the calcined discrete entities and 578 grams of the uncalcined discrete entities (approximately 400 grams based on $Al_2O_3$) were mixed with 557 ml. of water. This mixture was extruded through a 1/16 inch die-plate. The resulting extrudate was dried for 24 hours at 230°F. in a forced draft oven, broken into approximately 1/8 inch lengths and calcined using the procedure discussed previously. The calcined extrudate contained 2.19% by weight of volatile material, and had a packed density of 0.65 g./cc., a surface area of 249 $m^2$/gm, a total pore volume of 0.636 cc./g., a volume in pores greater than 500 A units radius of 0.12 cc./g. and a peak pore radius of 15,000 A units. X-ray diffraction analysis indicates that this product contains only gamma alumina.

Using conventional techniques, this calcined extrudate was treated with an aqueous solution containing $H_2PtCl_6$, $HReO_4$ and $HCl$. The treated extrudate was dried in a rotary evaporator until free flowing and apparently dry (about 1½ hours), and then for 16 hours at 230°F. in a forced draft oven. The dried product was calcined for 3 hours at 900°F. in a stream of dry air to form an improved catalyst. The calcined catalyst was found to contain 2.67% by weight volatile matter, 0.314% by weight of platinum, 0.363% by weight of rhenium, and 0.92% by weight chloride.

This catalyst was performance tested in hydrocarbon reforming service using a typical mid-continent naphtha feedstock at 950°F., 4.0 weight hourly space velocity and a mole ratio of $H_2$ to hydrocarbon of 3. Results of this test are as follows: a liquid hydrocarbon product having an initial research octane number, clear, of 101.3 and an aging rate of 1.2 octane numbers per 100 hours of operation. Based upon data correlation techniques known to give reasonable predictions of commercial catalyst aging behavior, this catalyst was determined to have a standard aging rate of 1.0 when the initial octane number is corrected to 100.

EXAMPLE II

This example illustrates the improved properties of the composition and method of the present invention.

As alumina hydrate slurry similar to that used in Example I but without the surfactant added was spray dried and a portion calcined in a manner similar to that of Example I. This calcined material was ground to less than about 40 microns.

This ground material was mixed with uncalcined boehmite alumina in a weight ratio of 1:2, based upon $Al_2O_3$ and extruded and calcined as described in Example I. The calcined extrudate had a surface area of 334 m²/gm and a total pore volume of 0.636 cc./g. Using the conventional technique used in Example I, this calcined extrudate was treated with an aqueous solution containing $H_2PtCl_6$, $HReO_4$ and HCl. The treated extrudate was dried and calcined as described in Example I to form a hydroforming catalyst. This catalyst contained 3.13% by weight of volatile matter, 0.334 platinum, 0.337% by weight rhenium and 0.91% by weight chloride. The catalyst had surface area of 250 m²/gm. This catalyst was tested in hydrocarbon reforming service in a manner similar to that described in Example I. An initial research octane number, clear, of 101.7 and a aging rate of 2.4 octane numbers/100 hours was obtained. Correcting these results to a 100 research octane number, clear, initial activity, a standard aging rate of 2.0 octane number per 100 hours was obtained.

Example I which illustrates the composition and methods of this invention provided a catalyst which had a standard aging rate of ½ that of a catalyst prepared without using the compositions or methods. This improved aging rate was obtained despite the somewhat higher platinum content of the catalyst in Example II. Thus, the composition and method of the present invention provided improved results as illustrated by these Examples.

While this invention has been described with respect to various specific examples and embodiments, it is to be understood that the invention is not limited thereto and that it can be variously practiced within the scope of the following claims.

The embodiments of the invention in which an exclusive property or privilege is claimed are defined as follows:

1. A composition of matter comprising macrosize particles containing a mixture of two distinct phases, said phases being (1) calcined discrete entities comprising first alumina, a major portion of said entities having a minimum dimension greater than about 50 microns and a maximum dimension of less than 200 microns and (2) a phase comprising calcined second alumina wherein the weight ratio of (1) to (2) is within the range from about 0.05:1 to about 2:1 and said second alumina is first calcined after the formation of macrosize particles.

2. The composition of claim 1, wherein at least 80% by weight of said entities have a maximum dimension of less than about 200 microns.

3. The composition of claim 2 wherein the weight ratio of (1) to (2) is within the range from about 0.1:1 to about 1.5:1.

4. The composition of claim 3 wherein each said first alumina and said second alumina is derived from hydrous alumina predominating in a material selected from the group consisting of aluminum monohydrate, aluminum trihydrates and mixtures thereof.

5. The composition of claim 4 wherein said first and second alumina is derived from hydrous alumina predominating in the same material and the weight ratio of (1) to (2) is within the range from about 0.2:1 to about 1:1.

6. The composition of claim 5 wherein said material is alumina monohydrate.

7. The composition of claim 2 which further comprises from about 0.05 to about 3% by weight of at least one catalytically active platinum group metal component, calculated as elemental platinum group metal.

8. The composition of claim 3 which further comprises from about 0.05 to about 10% by weight of at least one catalytically active platinum group metal component, calculated as elemental platinum group metal, and from about 0.1 to about 1.5% by weight calculated as elemental halogen of a catalytically active halogen component selected from the group consisting of fluorine component, chlorine component, bromine component and mixtures thereof.

9. The composition of claim 6 which further comprises from about 0.05 to about 1.0% by weight of catalytically active platinum component, calculated as elemental platinum, from about 0.1 to about 1.5% by weight of a catalytically active chlorine component, calculated as elemental chlorine, and from about 0.01 to about 5% by weight of catalytically active rhenium component, calculated elemental rhenium.

10. A method for producing an improved composition of matter which comprises:
 1. (a) forming a first aqueous slurry of hydrous alumina, drying at least a portion of said first slurry and thereby forming discrete entities the major portion of which upon calcination have a minimum dimension greater than about 50 microns and a maximum dimension less than about 200 microns and calcining said discrete entities, and (b) forming a second aqueous slurry of hydrous alumina, and drying at least a portion of said second slurry at a temperature below the point at which substantial amounts of water of hydration are released from the hydrous alumina to form a solid product which can be formed into macrosize particles;
 2. co-mingling said calcined discrete entities and said solid product to form a mixture wherein weight ratio of said discrete entities to said solid product, based upon $Al_2O_3$, is within the range from about 0.05:1 to about 2:1;
 3. forming said mixture into macrosize particles; and
 4. calcining said macrosize particles to form calcined particles.

11. The method of claim 10 wherein at least about 80% by weight of said discrete entities upon calcination have a maximum dimension of less than about 200 microns.

12. The method of claim 11 wherein the weight ratio of discrete entities to solid product based on $Al_2O_3$, is within the range from about 0.1:1 to about 1.5:1.

13. The method of claim 12 wherein the hydrous alumina of said discrete entities and said solid product predominate in a material independently selected from the group consisting of alumina monohydrate, alumina trihydrates and mixtures thereof, and both said first and second aqueous slurries comprise from about 5 to about 16% by weight of alumina, calculated as $Al_2O_3$.

14. The method of claim 13 wherein the drying of said first aqueous slurry comprises spray drying and said second aqueous slurry is dried at a temperature below about 500°F.

15. The method of claim 14, wherein the hydrous alumina of said discrete entities and said solid product predominate in the same material and the weight ratio of discrete entities to solid product, based on $Al_2O_3$, is within the range from about 0.2:1 to about 1:1.

16. The method of claim 15 wherein said aqueous slurry and said second aqueous slurry are formed as one slurry.

17. The method of claim 16 wherein at least one of said first and second aqueous slurries are dried in the presence of at least about 0.001% by weight, based on the total amount of water present, of at least one surface active agent.

18. The method of claim 17 wherein the hydrous alumina of said discrete entities and said solid product predominates in alumina monohydrate and said surface active agent is selected from the group consisting of $$R{-}(OC_2H_4)_x{-}OH$$

and mixtures thereof, wherein R is selected from the group consisting of monovalent hydrocarbon radical containing from 10 to about 50 carbon atoms and $x$ is an integer from about 2 to about 50.

* * * * *